Feb. 14, 1933.                L. E. ZERBE                1,897,564
              GRIPPING MECHANISM FOR ROTARY DRILLING MACHINES
                          Filed Sept. 9, 1930
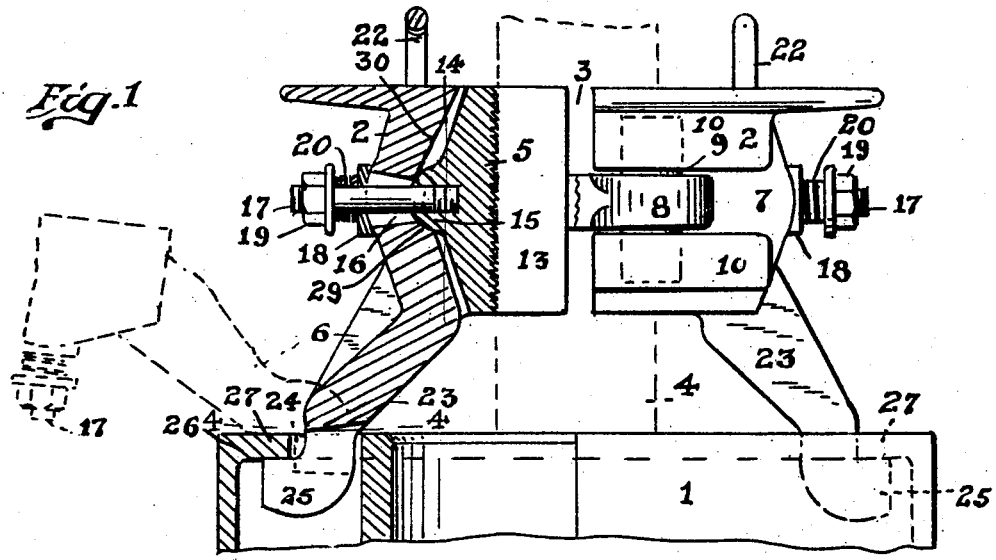
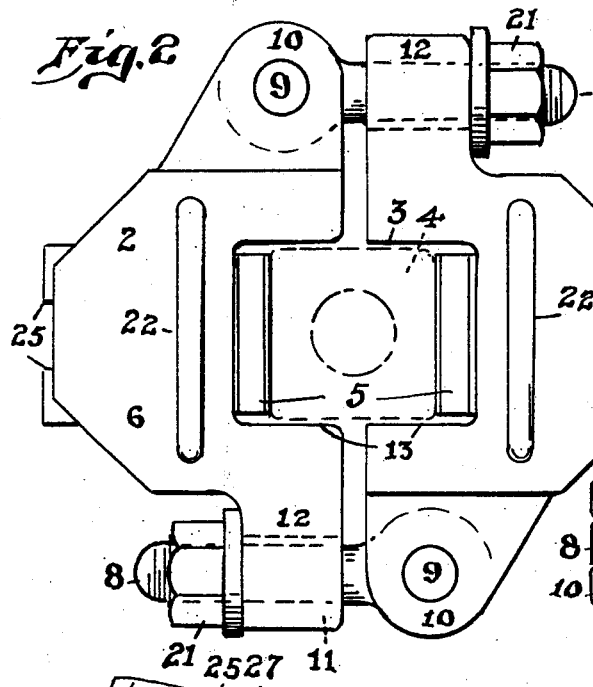
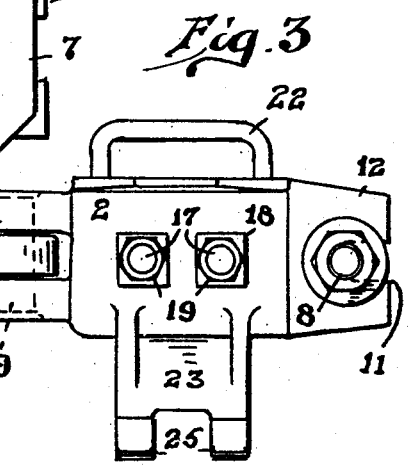
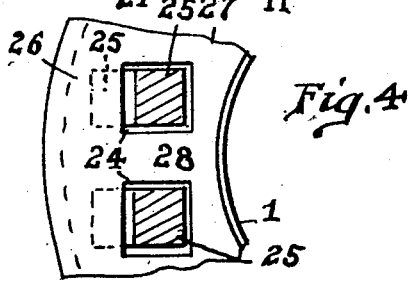
INVENTOR
L. E. Zerbe
by F. N. Barber
attorney Patented Feb. 14, 1933

1,897,564

UNITED STATES PATENT OFFICE

LEWIS E. ZERBE, OF MONETA, CALIFORNIA, ASSIGNOR TO THE NATIONAL SUPPLY COMPANY, OF TOLEDO, OHIO, A CORPORATION OF OHIO

GRIPPING MECHANISM FOR ROTARY DRILLING MACHINES

Application filed September 9, 1930. Serial No. 480,719.

My invention relates to means for retaining the drill stems of rotary drilling tables against upward movement or displacement through the table.

One object of this invention is to provide a clamping or gripping device carried by a rotary table and cooperating with a drill stem to prevent its upward movement or displacement. Another object is to provide gripping elements or slips which have a loose fit with their holders so that they may automatically adjust themselves against the faces of the drill stem which they engage and produce a clamping engagement with the table. Another object is to provide for the slips a divided body having means for removably connecting them with the table, there being additional means for uniting the divided parts of the body into a rigid unit. Other objects appear hereinafter.

Referring to the accompanying drawing, Fig. 1 shows the upper portion of a rotary element of a rotary drilling machine together with my invention connected thereto, the right hand side of the view being in side elevation and the left hand side thereof in vertical section. Fig. 2 is a plan view of Fig. 1 without the rotary element. Fig. 3 is a side elevation of Fig. 2 viewed from the right. Fig. 4 is a view on the line 4—4 on Fig. 1.

On the drawing, 1 designates a rotary element carried by a rotary drilling machine. This element may be the rotary table itself or a table bushing carried by the table.

I provide a body 2 having the central opening 3 to receive the drill stem 4 which is clamped to the body between two slips 5. The body 2 is composed of two duplicate or interchangeable members 6 and 7. Each member carries an eye-bolt 8 mounted upon a pivot in an ear 10. The bolt on each member may be swung into a slot 11 in a lug 12 in the other member. Nuts on the bolts are screwed up against the outer faces of the lugs 12 to adjust the relative positions of the two members 6 and 7.

The opposing faces of the members 6 and 7 have rectangular recesses 13 therein which together constitute the said opening 3.

Opposite faces of the drill stem are engageable by the slips 5 whose outer faces converge outwardly and are seated in correspondingly converging recesses 14 in the inner or opposing faces of the members 6 and 7. The outermost portions 15 of the slips engage the outermost portions of the recesses 14, but the outer faces of the slips are spaced from the adjacent faces of the body members except as shown at 15. This outermost portion 15 is preferably rounded so that the slips can have free and easy rocking motions in order that the gripping faces of the slips may accommodate or adjust themselves to the faces of the drill stem along the entire gripping faces of the slips. This prevents any wedging action or stresses being set up between the slips and the body members except at the portion 15 which receives in the vicinity of the bolt all of the horizontal stresses. The portions 15 are seated in recesses 29 in the members 6 and 7 below the bolts 17 to prevent the slips from moving down on the said members, and the upper surfaces of the said portions 15 will ride up somewhat on the inclined inner faces 30 of the recesses 14 to cause the slips to move inwardly toward the drill stem and grip it more tightly in case the drill stem is moved upwardly.

The body members 6 and 7 have lateral openings 16 flaring outwardly and receiving the bolts or stems 17 having their inner ends screwed into the slips. The outer faces of the members 6 and 7 at the sides of the opening 16 are rounded and are supplied with washers 18 on the bolts. Nuts 19 are applied to the outer ends of the bolts 17 and bear against the springs 20 seated between the washers 18 and the nuts 19. The springs provide means for yieldingly holding the slips in their seats so that the slips can adjust themselves to the drill stem.

It is seen that when the drill stem is in the opening 3 and between the slips 5, the latter may be caused to grip the drill stem by the operation of the nuts 21 on the bolts 8.

Each of the members 6 and 7 is provided with a depending leg 23 extending through openings 24 in the top of the element 1 and having outwardly extending toes or hooks 25 projecting laterally into an extension 26 of the opening 24. This extension in the present instance is shown as being a space under the top member 27 of the element 1. With the means just described the clamping means would be securely held from upward movement by any force applied to the drill stem. The web or portion 28 of the top member 27 between the toes 25 forms a seat for those parts of the legs 23 which are between the toes so as to support the legs and all that is suspended on them.

By loosening the nuts 21 the bolts 8 may be swung outwardly and the members 6 and 7 may be swung laterally so that the toes 25 may be readily removed from the openings 24. The dotted lines in Fig. 1 show the member 6 swung over to the left so that its toe 25 may be removed from the opening 24 or so that the member 6 may be elevated so as to position its toe 25 beneath the member 27 as shown on Fig. 1.

I claim:—

1. In a rotary drilling apparatus, a horizontal support, an upstanding body having swinging depending legs provided with hooks removably inserted through openings in the support and interlocked by the swinging of the legs with the said support to prevent upward movement of the body, and clamping means supported by the upper end of body and adapted to engage and suspend a pipe.

2. In a rotary drilling apparatus, a support having a central opening and other openings in the upper surface with lateral extensions, a body having depending legs with toes projecting down through the said other openings and into the said lateral extensions thereof to prevent the upward movement of the body, and means for clamping an object in the central opening.

3. In a rotary drilling apparatus, a support having a central opening and other openings in the upper surface with lateral extensions, a body comprising plural members having depending legs with toes located in the said other openings and projecting into the said lateral extensions when the body members are in normal positions, means in the central opening for effecting clamping engagement with an object in the central opening, and bolts for holding the body members in a rigid unit.

4. In a rotary drilling apparatus, a body with a central opening and lateral openings with outwardly flaring walls, rockingly-mounted means arranged to engage an object in the central opening, means for causing the first means to be clamped to the object, and stems attached to the outer faces of the first means and extending outwardly loosely through the lateral openings, whereby the clamping faces of the first means may adjust themselves automatically against the sides of the object.

5. In a rotary drilling apparatus, a body with a central opening and lateral openings with outwardly flaring walls, rockingly-mounted means arranged to engage an object in the central opening, means for causing the first means to be clamped to the object, and stems attached to the outer faces of the first means and extending outwardly loosely through the lateral openings, whereby the clamping faces of the first means may adjust themselves automatically against the sides of the object, in combination with means cooperating with the stems on the first means and with the body for holding the first means in proper assembly with the body.

6. In a rotary drilling apparatus, a body having a central opening with tapered recesses facing the opening, means in the opening having clamping faces for engagement with an object in the opening, the outer faces of the said means being tapered outwardly and nesting with the inner faces of the recesses, but rockable in the recesses to permit the said means to adjust their entire clamping faces against the object.

7. In a rotary drilling apparatus, a support having a vertical central opening and other openings in the upper surface with lateral extensions, a body having depending legs with toes projecting down through the said other openings and into the said lateral extensions thereof to prevent the upward movement of the body, and means for clamping an object in the central opening, the support being continuous between the toes of each leg to form a support for the legs and the load thereon.

8. In a rotary drilling apparatus, a support, oppositely arranged means for engaging the periphery of a vertically-extending object, the outer faces of the said means converging outwardly, seats for the said means flaring outwardly, but at a greater angle than the angle of flare of the outer faces of the said means, bolts securing each of said means to its seat and allowing some upward movement of the same, the contacting portions of the said means with their seats being adapted to ride up along the inner faces of the seats above the bolts to force the said means toward each other in case the object gripped by the said means is moved upwardly.

In testimony whereof I affix my signature.

LEWIS E. ZERBE.